June 5, 1956  E. GLUECK  2,748,481
DENTURE ARTICULATORS
Filed Aug. 12, 1954 3 Sheets-Sheet 1

INVENTOR.
EUGENE GLUECK
BY
Leo C. Krazinski
ATTORNEY

June 5, 1956 E. GLUECK 2,748,481
DENTURE ARTICULATORS
Filed Aug. 12, 1954 3 Sheets-Sheet 2

INVENTOR.
EUGENE GLUECK
BY Leo C. Krazinski
ATTORNEY

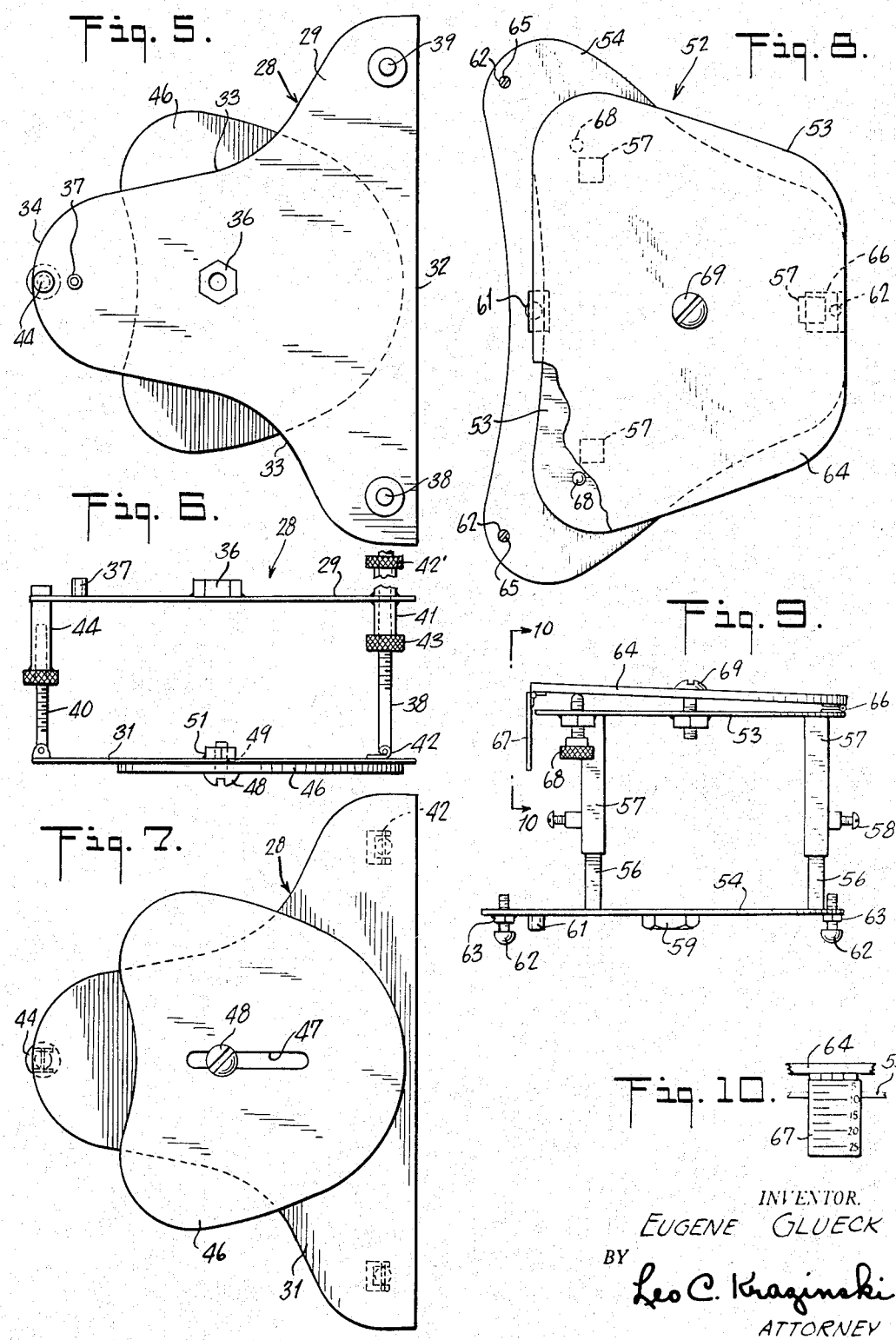

United States Patent Office 2,748,481
Patented June 5, 1956

---

2,748,481

DENTURE ARTICULATORS

Eugene Glueck, Bronx, N. Y.

Application August 12, 1954, Serial No. 449,405

16 Claims. (Cl. 32—32)

This invention relates to denture construction, particularly to articulators, and has for its primary object to provide an instrument which in the hands of an ordinary technician is capable of achieving balanced articulation with greater precision than that formerly done by experts.

Heretofore, as far as applicant is aware, instruments employed in the manufacture of prosthetic dentures have required dental technicians of the wide experience and ability, particularly since the main problem has been to stabilize the lower denture during the mastication. This problem has been difficult to solve because the occlusal plane was an imaginary plane and the dental technician was not guided by the instrument in establishing this plane for the proposed denture. The technician, therefore, established it by guesswork with the result that the occlusal plane inclination was usually different and not equal at the two sides of the denture. For example, on one side the denture might have an angle of 8° while on the other side the angle instead of being 8° will be plus or minus a one-half degree more or less, so that parallelism was absent. For grinding action, that is, during mastication, both the upper and lower dentures should have their planes parallel. Thus, according to prior practice, considerable modification work was required on the dentures before they were satisfactory, thereby causing considerable discomfort to the patient.

It is, therefore, another object of the invention to overcome the foregoing disadvantages and to provide an instrument wherein the correct occlusal plane can be readily and accurately established.

Yet another object of the invention is to provide an attachment for an articulator to establish the calculated occlusal plane.

Still another object of the invention is to provide an improved instrument having means for obtaining balanced occlusion in a prosthetic denture.

A further object of the invention is to provide an improved denture articulator which is simple and economical in construction and which is practical and reliable in the use thereof.

Other and further objects will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 5 is a top plan view of the upper attachment;

Fig. 6 is a side elevational view of the upper attachment shown in Fig. 5;

Fig. 7 is a bottom plan view of the upper attachment shown in Fig. 5;

Fig. 8 is a top plan view of the lower attachment;

Fig. 9 is a side elevational view of the lower attachment shown in Fig. 8; and

Fig. 10 is a front elevational view of the indicator scale shown in Fig. 9, taken along line 9—9 thereof in the direction of the arrows.

Figure 1:
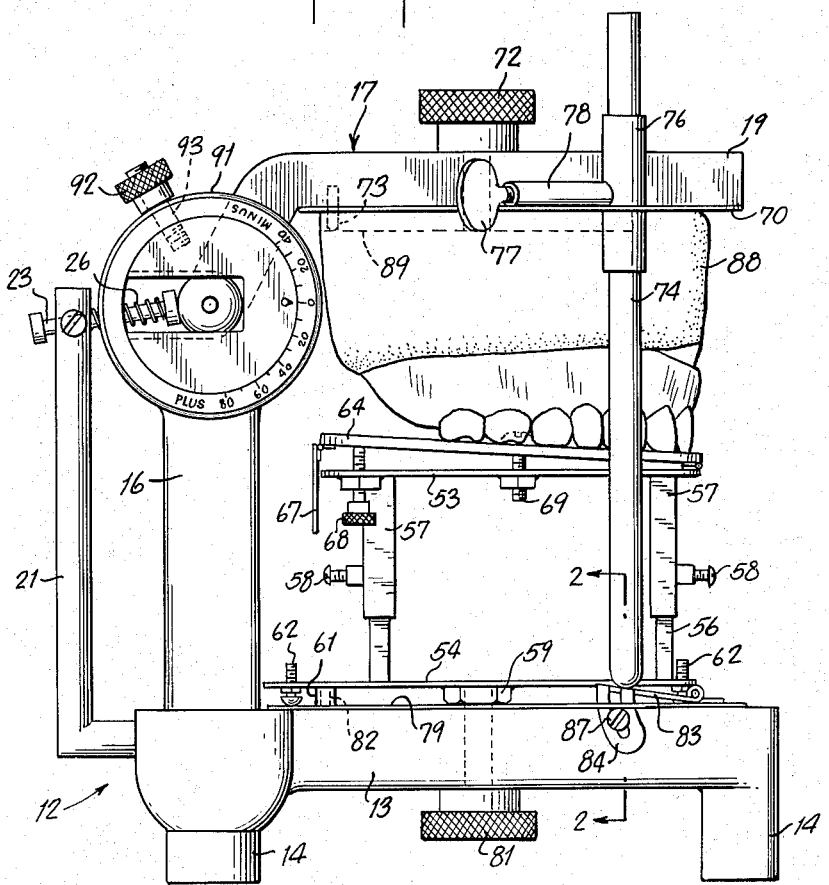
Fig. 1 is a right, side elevational view of the articulator of the invention showing the lower attachment in use for obtaining the occlusal plane of the maxillae or upper denture.
Figure 2:
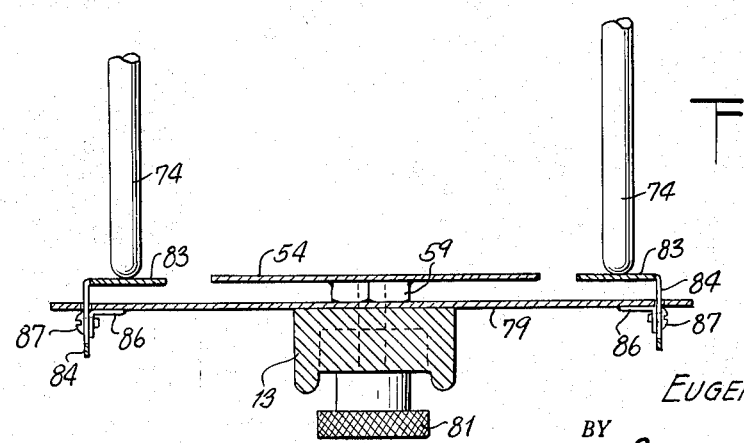
Fig. 2 is a sectional view taken along line 2—2 of Fig. 1 in the direction of the arrows.
Figure 3:
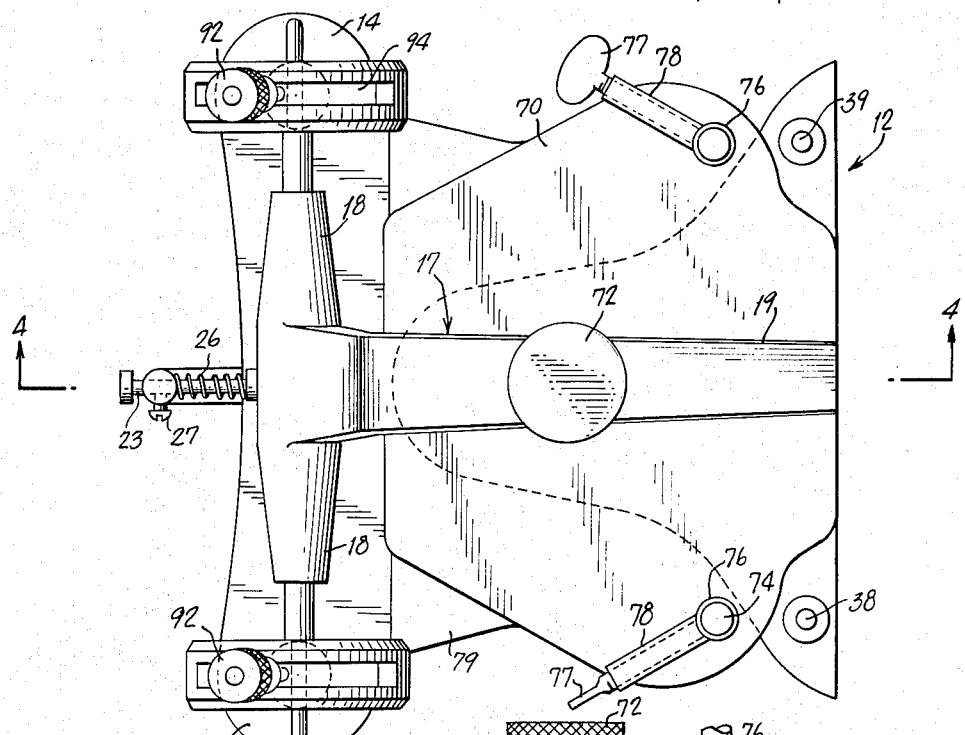
Fig. 3 is a top plan view of the articulator shown in Fig. 1.

Referring now to the drawings, particularly to Figs. 1, 2, 3 and 4, there is shown an articulator 12 patterned along the conventional Hanau articulator, as described in a booklet entitled, "Full Denture Prosthesis," published in 1930 by Rudolph L. Hanau, Buffalo, New York. Since the Hanau articulator is well known, a detailed description thereof is not believed necessary for an understanding of the present invention. However, the articulator 12 comprises broadly a base 13 having three triangularly disposed legs 14, two uprights 16 in continuation of the two rear legs 14, and a pivotally mounted upper member 17 having lateral arms 18 loosely journalled in the two uprights 16 and having a centrally disposed forwardly projecting arm 19 transverse to the lateral arms. An upright element 21, rigidly secured at its lower end to the base 13, as by a screw 22, is provided at the rear of the articulator 12 for urging the upper member 17 forwardly. Adjacent the upper end of the upright 21 is shown a double headed pin 23 slidably disposed in an opening 24 (Fig. 4) of the upright with a resilient element 26 between the upright and an inner head of the pin for biasing the pin against the lateral arms of the upper member 17. A set screw 27 is also provided for rigidly securing the pin 23 to the upright 21, for a purpose that will be explained hereinafter.

For a better understanding of the invention reference is now had to Figs. 5, 6, 7, 8, 9, and 10, wherein upper and lower attachments for the articulator are illustrated. At this point it might be mentioned that applicant's invention, particularly the attachments, can be adapted for use with any of the conventional articulators. Figs. 5, 6, and 7 relate to the upper attachment 28, which comprises a pair of spaced plates 29, 31 of similar outline and thickness. The plates are approximately triangular in shape having a straight edge 32 for one side and concave edges 33 for the other two sides that terminate in a rounded head 34. An internally threaded element, such as a nut 36, is rigidly secured to the top plate 29 in any suitable manner, as by solder, and adjacent thereto is also secured, in a similar manner, a hollow cylinder 37 having its longitudinal axis transverse to the plate 29.

The plates 29, 31 are adjustably separated, as by three studs 38, 39 and 40, each having a hinged connection 42 to the plate 31 at its lower end and having a threaded upper portion. Each of the upper portions of studs 38, 39 pass through a tubular element 41, which is rigidly secured to the plate 29 and which element extends through said plate. An internally threaded member, such as knurled nut 42' in mesh engagement with each of the free ends of studs 38, 39 determines the separation of the plates, an additional nut 43 on each of the studs 38, 39 intermediate the plates being provided for locking the adjustment in a predetermined position. The third stud 40 is shown in mesh engagement with an internally threaded tubular unit 44 loosely mounted on the plate 29.

Beneath the plate 31 is shown a third plate 46, preferably of plastic material, having a centrally disposed slot 47 and screw 48 passing therethrough, as well as through an opening 49 in the plate 31. The free end of the screw 48 is adapted for mesh engagement with an internally threaded nut 51, rigidly secured to the upper side of plate 31. The plate 46, which is arcuate in outline, can be rotated on the pivot screw 48, as well as moved translatorily along the slot 47.

In Figs. 8, 9 and 10 is shown a lower attachment 52 comprising a pair of plates 53, 54 adjustably separated by three telescopically arranged units, each unit consisting of a lower male element 56 and an upper female element 57, rigidly secured to the plates 54, 53, respectively. For locking the units in fixed position, set screws 58 are provided. Beneath plate 54, as seen in Fig. 9, are rigidly secured a nut 59 and a hollow cylindrical tube 61, both of which are respectively similar to nut 36 and cylinder 37 of the upper attachment 28. For leveling the lower attachment there are provided three screws 62 having heads that come to a blunt point, additional threads being provided in the plate 54 by rigidly securing nuts 63 thereto. For facilitating rotation of the screws 62, a slot 65 is formed in each free end thereof.

Above the upper plate 53 is shown a third plate 64, preferably of plastic material, having a hinge 66 at one edge thereof for pivotal connection therewith and at the opposite edge having a depending scale 67, as seen more clearly in Fig. 10, hingedly connected thereto. For raising the third plate 64 to a desired angle on the scale 67 a pair of screws 68 are threadedly disposed in plate 53 with their free ends adapted to engage the bottom surface of plate 64. An additional screw 69 passing down through plate 64 and threadedly engaging plate 53 is provided for limiting upward movement of the plate 64.

Figure 4:
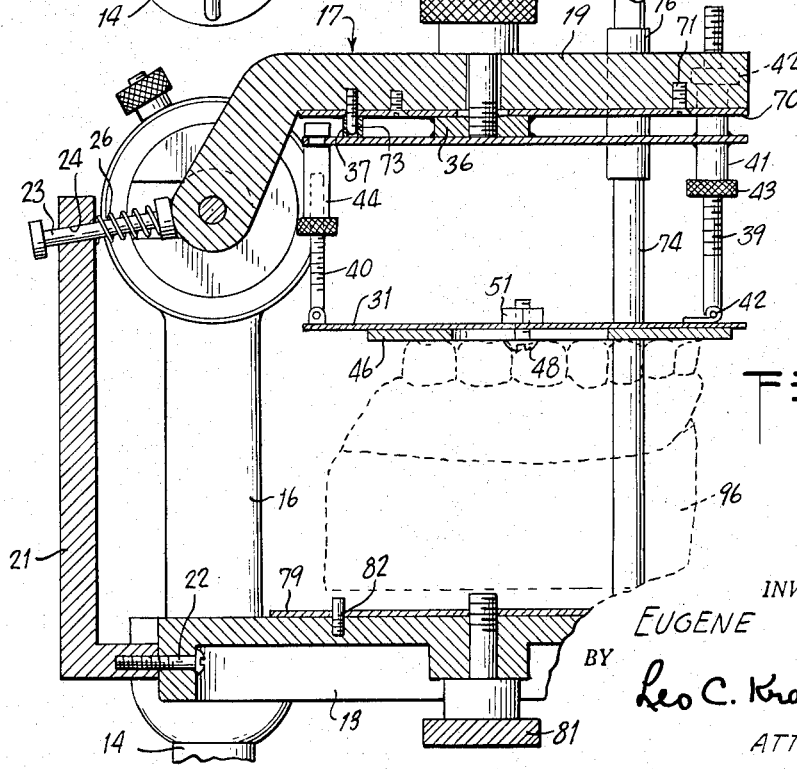
Fig. 4 is a sectional view taken along line 4—4 of Fig. 3 in the direction of the arrows.

Referring again to Figs. 1, 2, 3, and 4, there is shown a top plate 70 rigidly secured, as by screws 71, to the arm 19 of the upper member 17. As seen in Fig. 4, a large lock screw 72, freely rotatable in the arm 19, has a threaded end for engagement with the nut 36 of the upper attachment 28, while a projecting pin 73, shown threaded into the arm 19, is adapted for preventing rotation of the upper attachment after securement thereof to the arm 19. On the plate 70 are shown slidably mounted two spaced rods 74 having rounded and reduced lower ends, tubular members 76 rigidly fastened to the plate 70, as by solder, functioning as guideways for the rods. The rods 74 are adjustably secured in position by thumb screws 77 disposed in internally threaded members 78 rigidly secured to the members 76 and plate 70.

Similarly in the base 13 there is shown a bottom plate 79, rigidly secured thereto, a large lock screw 81 freely rotatable therein with a projecting threaded end for engagement with the nut 59 of the lower attachment, and a projecting pin 82 for reception by the hollow cylinder 61 in order to prevent rotation of the lower attachment. On the bottom plate 79 are shown a pair of hinged platforms 83 (Figs. 1 and 2) upon which the lower ends of rods 74 are adapted to ride. The platforms 83 may be inclined to the plate 79 at desired angles and to hold the platform at the desired inclination, as well as indicate the angle thereof, a slotted member 84 having angular degrees thereon is shown mounted on a bracket 86 rigidly fastened to the plate 79. A set screw 87 passing through the slotted member 84 and into a threaded opening of the bracket 86 is adapted to lock the platform in the desired position.

The operation of the articulator including the attachments of this invention will now be described. Referring to Fig. 1 and assuming that an upper prosthetic denture is to be made first, an upper jaw model 88 made of plaster of Paris and representing the maxillae is secured to the upper plate 70 by the lock screw 72, which is threadedly engaged with a mounting plate 89 carrying the model. The top plate 64 of the lower attachment 52 is first leveled horizontally by placing the attachment on a level surface and adjusting the screws 62, the inclination of plate 64 is set to a predetermined angle on the scale 67, and the lower attachment is then installed on the base 13, nut 59 being threaddedly engaged by lock screw 81 and projecting pin 82 being received into tube 61. The angle on scale 67 is determined by the free space between the upper and lower jaw models, which free space is obtainable in a conventional manner. The same angle set on scale 67 is now applied to both condylar guides 91 by loosening lock nuts 92, whereby studs 93, which are rigidly secured to guides 91, are free to move in slots 94 to their selected angular positions, after which the lock nuts are tightened.

Six front (anterior) teeth are, in general, initially placed in the model 88, and the lower edges of these teeth are aligned with the upper surface of the plate 64, now set at the aforesaid predetermined angle. This alignment of the interior teeth provides the correct occlusal plane, as if it were calculated. The posterior (back) teeth are usually then added with the bucal cusps thereof resting against the upper surface of plate 64. The teeth at both sides of the jaw, it should be noted, are at the correct plane because of the angular setting of plate 64.

For preparing the lower set of teeth (mandible), the lower attachment 52 is removed from the base 13 and model 96 containing said lower teeth is mounted on the base in its stead, as seen in dotted lines at the lower part of Fig. 4. Since the occlusal plane for the upper set of teeth is already obtained, it is only necessary to register the lower teeth against the upper teeth to obtain the occlusal plane for the lower teeth. Thus, parallelism is obtained in the lower teeth by using the upper teeth as a standard.

Both prosthetic dentures having had their correct occlusal planes obtained, the next step is to make certain that the contact surfaces of the upper and lower teeth are in proper mesh. The condyle 91 has already been set at a predetermined angle, as mentioned hereinbefore, so that it is urged forwardly in centric position. Said predetermined angle is then set on scale 84, whereby hinged plate 83 is correspondingly inclined at said angle, rods 74 and the upper denture rising as a unit therewith, since the lower ends of rods 74 rest on said plates. The lower denture being in a fixed position on the base 13, the upper set of teeth is then moved backwards, sidewards, and forwards by gripping the rods 74 and sliding the lower ends thereof on the inclined plates 83. Should certain cusps be in improper position, the adjustments are made by grinding or resetting the teeth. It is, therefore, to be noted that the inclined plates 83 and rods 74 control the predetermined contacts between the sets of teeth.

The hereinbefore mentioned procedure was based on building the teeth on the upper model as a standard and using the lower attachment. To use the lower model as a standard and the upper attachment, reference may be had to Fig. 4, wherein the lower model 96 with teeth therein is shown fixedly secured to the base 13 and the upper attachment 28 is fixedly secured to the upper arm 19 by lock nut 72 in nut 36, and stud 73 in cylinder 37. The lowermost plate 46 of the upper attachment is set to the predetermined angle by adjusting the position of the lower, hinged plate 31 through the nuts 42, 43 and 44, after which the upper edges of the teeth in model 96 are aligned against the lower surface of plate 46. The correct occlusal plane in the lower denture having been obtained, the upper attachment is then removed and the upper model 88 placed in its stead, after which the upper teeth are registered against the lower teeth, as a standard, in the hereinbefore mentioned manner. The remaining steps are the same as mentioned hereinbefore and it is not believed necessary to repeat them.

From the foregoing description, it will be seen that the present invention provides a novel and useful instrument which enables an ordinary technician to produce prosthetic dentures having correct occlusal planes at minimum time and effort.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

What is claimed is:

1. An articulator for producing a prosthetic denture comprising a support, a pair of opposed mounting means thereon, one of said mounting means being adapted to carry a denture model having teeth extending therefrom, and an attachment for providing a predetermined occlusal plane in the denture, said attachment comprising a plate rigidly secured to the other of said mounting means, a second plate spaced from said first plate for engagement with said teeth, and means including internally threaded members on said first plate and complementary, externally threaded members pivotally connected to said second plate for adjustably connecting said second plate to said first plate at a predetermined angle equal to said occlusal plane, whereby said teeth when disposed against said second plate are adapted to be set at said predetermined occlusal plane.

2. An articulator for producing a prosthetic denture comprising a support, a pair of opposed mounting means thereon, one of said mounting means being adapted to carry a denture model having teeth extending therefrom, and an attachment for providing a predetermined occlusal plane in the denture, said attachment comprising a plate rigidly secured to the other of said mounting means, a second plate spaced from said first plate for engagement with said teeth, and means including studs rigidly secured to said first plate, a third plate with receiving elements for said studs pivotally connected to said second plate, and a threaded member on said third plate adapted to engage said second plate for adjustably connecting said second plate to said first plate at a predetermined angle equal to said occlusal plane, whereby said teeth when disposed against said second plate are adapted to be set at said predetermined occlusal plane.

3. An articulator in accordance with claim 2, wherein said second plate includes a scale for indicating said predetermined occlusal plane angle and threaded means on said second and third plates for locking the second plate at said predetermined angle.

4. An articulator for producing a prosthetic denture comprising a support, a pair of opposed mounting bolts thereon, one of said mounting bolts being adapted to secure to said support a denture model having teeth extending therefrom, and an attachment for providing a predetermined occlusal plane in the denture, said attachment comprising a plate rigidly secured to the other of said mounting bolts, a second plate spaced from said first plate having a flat surface for abutting engagement with said teeth, and means including a hinge connection on one of said plates and a threaded connection at the other of said plates for adjustably connecting said second plate to said first plate at a predetermined angle equal to said occlusal plane, whereby said teeth when disposed against said second plate are adapted to be set at said predetermined plane.

5. An articulator for producing a prosthetic denture comprising a support, a pair of opposed mounting bolts thereon, one of said mounting bolts being adapted to secure to said support a denture model having teeth extending therefrom, and an attachment for providing a predetermined occlusal plane in the denture, said attachment comprising a plate, an internally threaded member on said plate in mesh engagement with the other of said mounting bolts, a second plate spaced from said first plate, a third plate, means for slidably attaching said third plate to said second plate, said third plate having a flat surface for abutting engagement with said teeth, and means including a hinge connection on said second plate and a threaded connection on said first plate for adjustably connecting said second plate to said first plate at a predetermined angle equal to said occlusal plane, whereby said teeth when disposed against said third plate are adapted to be set at said predetermined occlusal plane.

6. An articulator in accordance with claim 5, wherein said support includes a projecting element and said first plate includes a receiving element in registration with said projecting element for preventing lateral movement of said attachment after assembly to said support.

7. An articulator for producing a prosthetic denture comprising a support having a base, a top member spaced above said base, means extending upwardly from said base for pivotally supporting said top member, a pair of spaced, depending elements carried by said top member, a pair of hinged platforms on said base for engagement with respective lower ends of said depending elements, means for adjusting each of said platforms at a predetermined occlusal plane, and a pair of opposed mounting bolts respectively on said top member and said base, said bolts being respectively adapted to secure to said top member and base a pair of model dentures having teeth thereon, grinding action being applied to said teeth by manually moving the lower ends of said depending elements over said platforms.

8. An articulator in accordance with claim 7, wherein said top supporting means include a pair of spaced uprights having aligned slots therein, and said top member includes a pair of transverse arms slidable in said slots.

9. An articulator in accordance with claim 8, and resilient means in engagement with said arms for urging said top member in a forward direction during grinding action of said teeth.

10. An articulator for producing a prosthetic denture comprising a support having a base, a top member including a pair of transverse arms spaced above said base, means including a pair of spaced uprights extending from said base for pivotally supporting said top member, a pair of spaced, depending elements carried by said top member, adjusting means on said top member for said elements, a pair of hinged platforms on said base for engagement with respective ends of said depending elements, adjustable means for setting each of said platforms at a predetermined occlusal plane, and a pair of opposed mounting bolts respectively on said top member and said base, said bolts being respectively adapted to secure to said top member and base a model upper and lower denture having teeth thereon, said teeth being ground to a proper fit by manually moving the lower ends of said depending elements over said platforms.

11. An attachment for a dental articulator comprising, in combination, a plate adapted to be secured to said articulator, a second plate spaced from said first plate, and means for adjustably interconnecting said plates at predetermined angles.

12. An attachment for a dental articulator comprising, in combination, a plate adapted to be secured to said articulator, a second plate spaced from said first plate, means for adjustably interconnecting said plates, a third plate pivotally carried by said second plate, and means carried by said second plate for adjusting said third plate at a predetermined angle with respect to said second plate.

13. An attachment in accordance with claim 12, wherein said first plate includes threaded means for securement to said articulator and three triangularly spaced screws for levelling said attachment on a horizontal surface prior to securement to said articulator.

14. An attachment in accordance with claim 13, wherein said third plate includes a depending scale with an edge of said second plate functioning as an indicator for said scale.

15. An attachment in accordance with claim 12, wherein said plate adjusting means include telescopic male and female elements.

16. An attachment for a dental articulator comprising, in combination, a support, a plate including a threaded element adapted to be secured to said support, a second plate spaced from said first plate, means for adjustably interconnecting said plates, said means including three triangularly spaced, threaded studs hinged to said second plate, complementary receiving elements for said studs on said first plate, a third plate having a slot slidably carried by said second plate, and means including a set screw carried by said second plate for adjusting said third plate at a predetermined position with respect to said second plate.

References Cited in the file of this patent

UNITED STATES PATENTS 2,448,085  Dickson  Aug. 31, 1948